(No Model.)

W. H. ERNST.
GRAIN WEIGHING APPARATUS.

No. 278,114. Patented May 22, 1883.

WITNESSES:
Chas. T. Howell
C. Sedgwick

INVENTOR:
W. H. Ernst
BY Munn & Co
ATTORNEYS.

UNITED STATES PATENT OFFICE.

WILLIAM H. ERNST, OF CHASE, KANSAS.

GRAIN-WEIGHING APPARATUS.

SPECIFICATION forming part of Letters Patent No. 278,114, dated May 22, 1883.

Application filed February 12, 1883. (No model.)

*To all whom it may concern:*

Be it known that I, WILLIAM H. ERNST, of Chase, in the county of Rice and State of Kansas, have invented a new and Improved Grain-Weighing Apparatus, of which the following is a full, clear, and exact description.

My invention consists of a contrivance of apparatus for automatically weighing and registering the weight of grain, the said apparatus consisting of a couple of hoppers with falling bottoms and a shifting gate or valve, and connecting devices by which the bottom of one hopper, falling to discharge its load, is made to raise and close the bottom of the other hopper and shift the valve by which the grain is conducted into the respective hoppers, and the said falling bottoms are also caused to shift the registering apparatus, all as hereinafter fully described.

Reference is to be had to the accompanying drawings, forming part of this specification, in which similar letters of reference indicate corresponding parts in all the figures.

Figure 1:
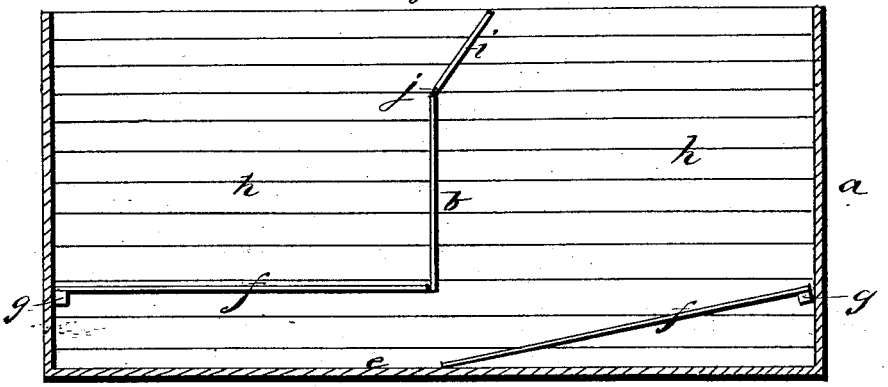
Figure 2:
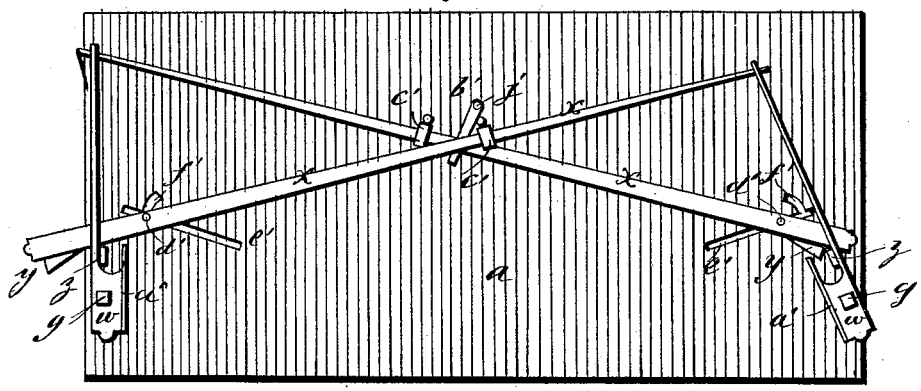
Figure 3:
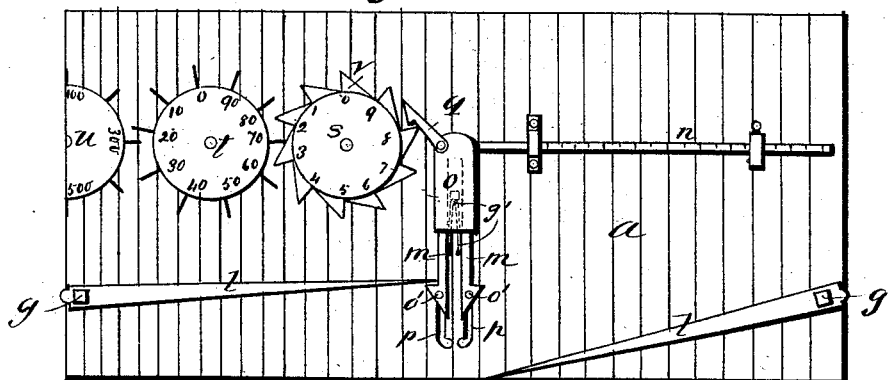

Figure 1 is a longitudinal sectional elevation of a box composing the two hoppers with falling bottoms. Figs. 2 and 3 are side elevations, showing the weighing, shifting, and registering apparatus.

I make a rectangular box, $a$, of any approved size, according to the quantity to be weighed at each draft, and partition it, at $b$, centrally between the ends, and in the middle portion between the top and bottom. Each side of the partition, and a suitable distance above the bottom $e$, I arrange a false bottom, $f$, on a pivot-bar, $g$, at the outer ends of the box $a$, so as to swing up to the partition $b$, to open and close the respective hoppers $h$, separated by partition $b$, and over said partition $b$, I provide a shifting gate or valve, $i$, to turn the grain into the respective hoppers. The pivot-bars $g$ extend through both sides of the box, and the pivot $j$ of valve $i$ extends through one side of the box. At one side of the box the pivot-bars $g$ have each a lever, $l$, working in connection with the bevel-pointed hooks $m$, suspended from the weigh-beam $n$, said hooks being connected to a box, $o$, containing a spring, $g'$, which tends to spring the hooks apart, and having guide-pins $o'$, which work in slots $p$, which curve at the lower ends so as to swing the hooks toward each other for allowing the escape of the falling lever and the engagement of the rising one.

The box $o$ has a pawl, $q$, which works the register-disks $s\ t\ u$ by the ratchet $v$. At the other side of the box the pivot-bars $g$ carry levers $w$, which at the upper ends are connected to push-bars $x$, which extend across from each of said levers and rest in the other, said levers having a slot for the purpose a short distance above the pivot-bars. Near the ends resting in these slots the said push-bars have a catch-lug, $y$, to drop and engage pieces $z$, as shown at the right hand of Fig. 2, and under each catch-lug is a tripper, $a'$, attached to levers $w$, for throwing catch-lugs $y$ off of catch-pieces $z$, as shown in the left hand of Fig. 2.

Where the push-bars $x$ cross each other the valve $i$ has an arm, $b'$, by which it is shifted when the push-bars are shifted by the levers $w$, said push-bars having push-lugs $c'$ attached to them for the purpose.

The push-bars have a guide-stud, $d'$, working in connection with inclined guiding-grooves $e'$ in the side of the box, to cause the bars to traverse in the proper relations to the trippers $a'$ and catch-pieces $z$ of the levers $w$. These guide-grooves $e'$ keep the push-bars $x$ in contact with catch-pieces $z$ until the guide-studs $d'$ arrive at the curved branch grooves $f'$, when, the bottoms being raised, the trippers $a'$, which spring and yield a little to the pressure of the push-bars, throw them off. It will be seen that when the loaded bottom falls by reason of its weight overbalancing the weigh-bar, the lever $w$ of said bottom, being suitably engaged by rod $x$ and its catch-lug $y$ with the lever $w$ of the bottom to be raised, will push the latter lever, $w$, into the upright position, raising said bottom and at the same time engaging lever $l$ of said bottom with its hook $m$ of the weigh-bar.

The lug $c'$ of the push-bar $x$ first actuated will at the same time shift valve $i$ suitably for discharging the grain into the empty hopper, and when the lever $w$ of the bottom thus raised comes to the upright position the tripper $a'$ thereof will throw catch-lug $y$ off from catch-piece $z$, allowing the lever $w$ of the falling bottom to swing the length of its range. Thus it will be seen that the bottom to be raised closes up, ready to receive the grain, a little before the shifting of the valve $i$, and so that the lever $l$ of the rising bottom comes to a lodgment on its hook $m$ as soon as the lever $l$ of the falling bottom escapes from its hook.

The trippers $a'$ are to be adjustable up and down on the levers $w$, to enable them to be set properly with relation to the catches $y$, and the bottoms $f$ are to be suitably packed along their edges by flanged packing adapted to work sufficiently close to the sides of the box to prevent the escape of the grain, and at the same time so that grains will not be lodged or packed between them and the sides.

The registering-disks may be of the usual contrivance, as here shown, or of any approved arrangement.

It will be understood that the grain is to escape from the box $a$ below the bottoms $f$ through any suitable passages.

Having thus fully described my invention, I claim as new and desire to secure by Letters Patent—

1. The combination, with the hopper-bottoms $f$, of the pivoted bars $g$, levers $l$, and the bevel-pointed beam-hooks $m$, as and for the purpose specified.

2. The bevel-pointed hooks $m$, spring $g'$, and guides $o'$ $p$, in combination with the levers $l$, bottoms $f$, and the weigh-beam $m$, substantially as described.

3. The combination of levers $w$ and push-bars $x$ with the bottoms $f$, said push-bars being connected with the levers $w$, respectively, and having the catches $y$, and the levers $w$, having the trippers $a'$, and catches $z$, substantially as described.

4. The combination of the push-bars $x$ with the valve-arm $b'$, said push-bars being connected to levers $w$, substantially as described.

5. The push-bars $x$, in combination with levers $w$, and having catches $y$ and guides $d'$ $e'$ $f'$, substantially as described.

6. The combination, with the hooks $m$ $m$, of the box $o$, containing springs $g'$, guide-pins $o'$, and end-curved slots $p$ $p$, whereby the position of the hooks may be regulated, as described.

7. The combination, with the pivot-bars $g$, of the slotted levers $w$ and the push-bars $x$ $x$, as shown and described.

8. The combination, with the levers $w$, of the catch-lugs $y$ $u'$, the pieces $z$, and the trigger $a'$, as and for the purpose specified.

9. The combination of the crossing push-bars $x$ $x$, provided with push-lugs $c'$, and the valve $i$, having the arm $b'$, whereby said bars are shifted, as described.

WILLIAM HUMPHREY ERNST.

Witnesses:
 FREDERICK C. SHAW,
 DAVID H. CALLIS.